US009250155B2

(12) United States Patent
Schaedel (10) Patent No.: US 9,250,155 B2
(45) Date of Patent: Feb. 2, 2016

(54) DEVICE AND METHOD FOR DYNAMIC PRESSURE LOSS AND VALVE SEAL-TIGHTNESS TESTING ON A FOUR STROKE INTERNAL COMBUSTION ENGINE

(71) Applicant: Martin Schaedel, Aichelberg (DE)

(72) Inventor: Martin Schaedel, Aichelberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 9 days.

(21) Appl. No.: 13/919,181

(22) Filed: Jun. 17, 2013

(65) Prior Publication Data
US 2013/0333457 A1 Dec. 19, 2013

(30) Foreign Application Priority Data

Jun. 18, 2012 (DE) .......................... 10 2012 210 230

(51) Int. Cl.
| | | |
|---|---|---|
| *G01M 15/04* | (2006.01) | |
| *G01M 3/28* | (2006.01) | |
| *G01M 15/05* | (2006.01) | |
| *G01M 15/09* | (2006.01) | |
| *G01M 15/10* | (2006.01) | |

(52) U.S. Cl.
CPC ............ *G01M 15/04* (2013.01); *G01M 3/2876* (2013.01); *G01M 15/05* (2013.01); *G01M 15/09* (2013.01); *G01M 15/106* (2013.01)

(58) Field of Classification Search
CPC ... G01M 15/09; G01M 15/04; G01M 15/106; G01M 15/05
USPC ....................................................... 73/114.37
See application file for complete search history.

(56) References Cited

U.S. PATENT DOCUMENTS

| | | | | |
|---|---|---|---|---|
| 5,417,109 | A | * | 5/1995 | Scourtes ..................... 73/114.01 |
| 5,705,742 | A | * | 1/1998 | Fox et al. ................... 73/114.79 |
| 6,561,014 | B1 | * | 5/2003 | Osterhout et al. ......... 73/116.05 |
| 7,181,379 | B2 | * | 2/2007 | Glinsky ........................... 703/8 |
| 7,694,554 | B1 | * | 4/2010 | Thompson ................ 73/114.06 |
| 7,899,608 | B1 | * | 3/2011 | Pederson et al. .............. 701/111 |
| 7,934,419 | B2 | * | 5/2011 | Saito et al. ................. 73/114.37 |
| 8,375,770 | B2 | * | 2/2013 | Lund .............................. 73/49.7 |
| 2003/0084712 | A1 | * | 5/2003 | Smith et al. .................. 73/118.1 |
| 2004/0186699 | A1 | * | 9/2004 | Glinsky ........................... 703/8 |
| 2006/0169248 | A1 | * | 8/2006 | Chida et al. ................... 123/399 |
| 2008/0302173 | A1 | * | 12/2008 | Saito et al. ................. 73/114.33 |

FOREIGN PATENT DOCUMENTS

DE          44 15 768          11/1995

\* cited by examiner

*Primary Examiner* — Freddie Kirkland, III
(74) *Attorney, Agent, or Firm* — Kenyon & Kenyon LLP (57) ABSTRACT

An engine testing device for dynamic pressure loss and valve seal-tightness testing of a running four-stroke engine includes: a first pressure gauge detecting a pressure value in an air intake line to a cylinder of the engine and outputting a first output signal indicative of the pressure value detected; a second pressure gauge detecting a pressure value in an exhaust line of the engine and outputting a second output signal indicative of the pressure value detected; a trigger device detecting an electrical signal indicative of when a selected cylinder of the engine is the particular active cylinder; and a measured value detection device detecting the output signals of the first and second pressure gauges and an output signal of the trigger device, such that an association between points in time of the pressure measurements and the particular active cylinder is enabled.

13 Claims, 6 Drawing Sheets

DEVICE AND METHOD FOR DYNAMIC PRESSURE LOSS AND VALVE SEAL-TIGHTNESS TESTING ON A FOUR STROKE INTERNAL COMBUSTION ENGINE

BACKGROUND OF THE INVENTION

1. Field of the Invention

The present invention relates to a device and a method for testing pressure loss and valve seal-tightness on a four-stroke internal combustion engine.

2. Description of the Related Art

For vehicle testing technology in repair shops, vehicle system analysis (VSA) engine testing devices or repair shop testing systems, including engine testers, are known, for example the FSA 740 edition of the applicant of the present patent application, which combine the customary functions of classical engine testers in one device. These functions include the measurement of engine-related signals such as primary and secondary ignition coils, control signals for ignition modules, rotational speed, cylinder 1 synchronization, and setting of the ignition timing. These types of VSA engine testing devices may also carry out customary checking and testing functions on recent vehicles, including reading out error memories and actual values, as well as controlling actuators, operating a signal generator for simulating sensor signals for testing sensors together with supply lines and plug-in connections, in particular in the installed state, testing components for the exact location of an error of the component in the installed state, the measuring technique and the display device being preset for the particular components. These types of engine testing devices may also be equipped with one or multiple modules for measuring vehicle emissions.

Figure 1:
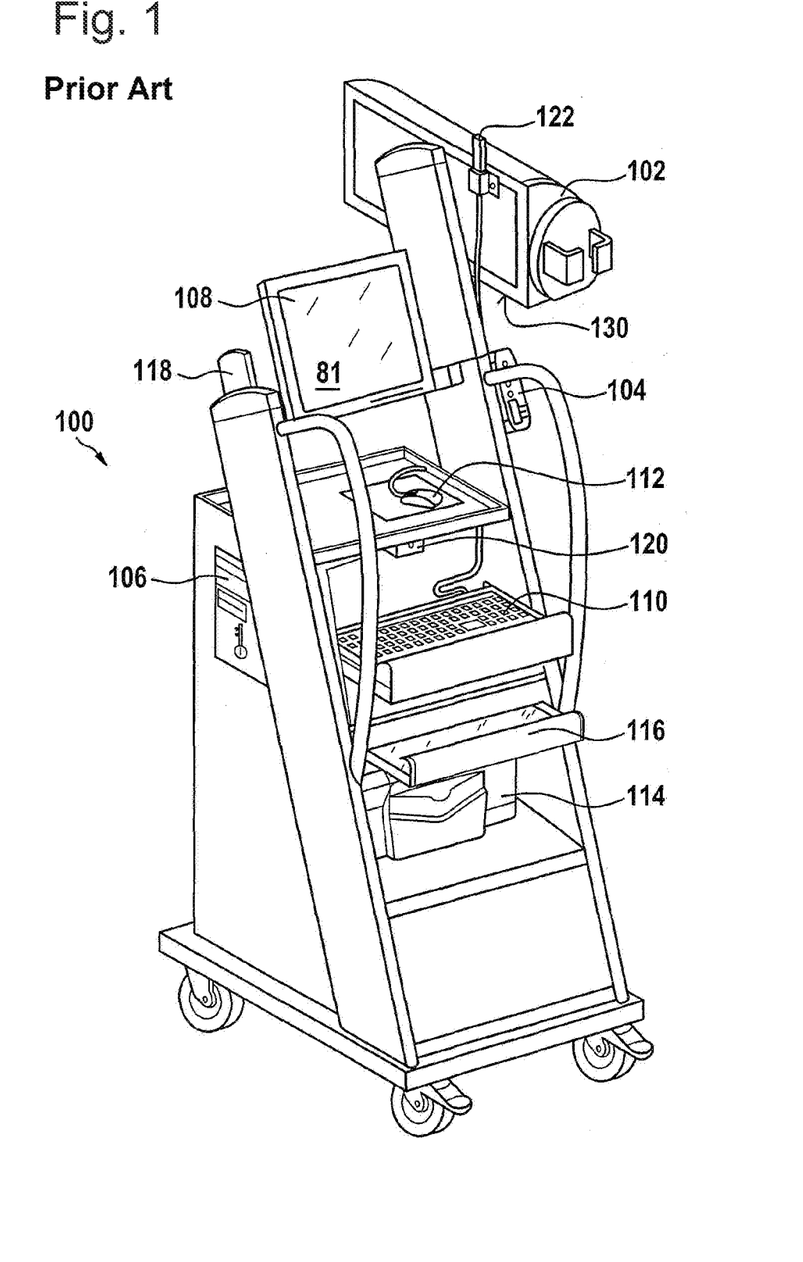
FIG. 1 shows a perspective view of a known engine testing device which may be used as the basis for an engine testing device according to the present invention, and which may be expanded to form same.

Vehicle system analysis (VSA) engine testing device 100 shown as an example in FIG. 1 is designed for use in a repair shop, in particular a motor vehicle repair shop. Engine testing device 100 is set up on a rollable stand provided with lockable rollers as shown in FIG. 1, for example, and includes a measuring unit 102, as an essential element, in which the signals are received by the various measuring sensors and converted into internally usable electrical signals, an expansion module 104 for newly added measuring functions relating in particular to the measurement of exhaust gases, a PC 106 having diskette, CD, and DVD drives as well as memory card and USB connections for external accessory devices, a display device 108, for example a monitor in particular, which is connected to the PC, input devices which are connected to PC 106, such as a keyboard 110 and a mouse 112 in particular, a printer 114, likewise connected to PC 106, for outputting measurement reports, an extendable printer cover 116 for protecting the printer and for placing tools for easy access for service personnel, a removable remote control unit 118 for remote operation of engine testing device 100, a remote control receiver 120 for receiving signals emitted by remote control unit 118, a Bluetooth USB adapter 122 and a terminal strip 130 for measuring unit 102, strip 130 being equipped with a plurality of input sockets, some of which are different, for various measuring sensors and control units, and being situated, for example, on a bottom side of measuring unit 102 (as indicated in FIG. 1) or on a back side (not shown) of engine testing device 100 situated in the rollable stand.

As mentioned above, terminal strip 130 of measuring unit 102 includes a plurality of connection sockets, some of which are different, for the various measuring sensors, for example a connection socket 132 for a temperature sensor, a connection socket 134 for the positive and negative battery terminals, a connection socket 136 for a terminal 1 measuring sensor or a terminal 15 measuring sensor, or a measuring sensor of the EFT, TN, or TD series, a connection socket 138 for a trigger device controlled by units of the ignition device of an engine to be tested, a connection socket 140 for a serial interface, for example an RS232 interface, a connection socket 142 for a sensor for measuring a negative high voltage, for example a KV− sensor, a connection socket 144 for a USB connection for a data link to the PC, a connection socket 146 for a sensor for a positive high voltage, for example a KV+ sensor, a connection socket 148 for a voltage supply of measuring unit 102 which is usable as a power supply output of measuring unit 102, a connection socket 150 for a measuring line used in many known standardized sensors, i.e., a so-called channel 1 (CH1) multimeter line or, for example, a current probe for a measuring range of up to 30 A, a connection socket 152 for a further measuring line used in various known standardized sensors, i.e., a so-called channel 2 (CH2) multimeter line or, for example, a current probe for a measuring range of up to 30 A or up to 1000 A, for example, a connection socket 154 for a stroboscope, a connection socket 156 for an air pressure sensor, and a connection socket 158 for a fluid pressure gauge. One example of a so-called clip-on trigger sensor 64 designed for use with a four-stroke internal combustion engine is shown as an example in FIG. 5.

Pressure loss testing on four-stroke internal combustion engines is presently carried out statically, i.e., with the engine idling. A static pressure loss test is relatively time-consuming, since it requires removal of various components of the engine, including the spark plugs, glow plugs, injector nozzles, etc. After the components have been removed, the piston of each individual cylinder of the engine must be brought into the so-called top dead center (TDC) of the compression stroke and fixed. A pressure loss tester is subsequently connected, acted on by compressed air, and calibrated. The pressure loss may be subsequently read off on an appropriate pressure testing device. A possible source of error, i.e., a cause of a possible pressure loss, must be ascertained by locating the air leak. It is not possible to draw conclusions concerning the seal-tightness during actual operation of the engine, i.e., with the engine running, using this type of statically conducted pressure loss testing.

BRIEF SUMMARY OF THE INVENTION

The present invention provides an engine testing device for testing dynamic pressure loss and valve seal-tightness on a four-stroke internal combustion engine.

An engine testing device for detecting pressures in an air intake line and in an exhaust line of a four-stroke internal combustion engine with the engine running, and for dynamic pressure loss and valve seal-tightness testing on the engine, includes the following:

a first pressure gauge for detecting a pressure value in an air intake line to a cylinder of the engine, which in particular is running, and for outputting a first output signal that is indicative of the pressure value to be detected by the first pressure gauge, a second pressure gauge for detecting a pressure value in an exhaust line of the engine, which in particular is running, and for outputting a second output signal that is indicative of the pressure value to be detected by the second pressure gauge, a trigger device for detecting an electrical signal that is indicative of when a certain cylinder of the engine, which in particular is running, is the particular active cylinder, and a measured value detection device for detecting the output signal of the first pressure gauge, the output signal of the second pressure gauge, and
an output signal of the trigger device.

The engine testing device is designed to allow an association between points in time of the pressure measurement by the first and the second pressure gauges and the particular active cylinder of the engine.

The engine testing device according to the present invention allows pressure loss testing to be carried out on four-stroke internal combustion engines with the engine running. The engine testing device according to the present invention also allows leaks, for example at the intake valves and/or exhaust valves, to be recognized and located with the engine running. In addition, significantly shorter diagnostic times are possible.

The pressure value in the air intake line may be a variation in pressure over time in the air intake line. The pressure value in the exhaust line may likewise be a variation in pressure over time in the exhaust line.

The engine testing device may also include the following:
a first adapter device for installing a first pressure sensor of the first pressure gauge on the air intake line of the engine, for accommodating the first pressure sensor, and for establishing fluid and pressure communication between a line interior of the air intake line and the first pressure sensor, and
a second adapter device for installing a second pressure sensor of the second pressure gauge on the exhaust line of the engine, for accommodating the second pressure sensor, and for establishing fluid and pressure communication between a line interior of the exhaust line and the second pressure sensor.

The engine testing device may include a display device for displaying at least one of the following pieces of pressure information: a variation in pressure over time in at least one air intake line to at least one cylinder of the engine, a variation in pressure over time in an exhaust line, a minimum pressure value, a maximum pressure value, and an average pressure value, in particular a time-averaged value, in the at least one air intake line to the at least one cylinder of the engine, and a minimum pressure value, a maximum pressure value, and an average pressure value, in particular a time-averaged value, in the exhaust line of the engine.

The display device of the engine testing device may be designed to allow a visual comparison of the pressure information of at least two, in particular all, cylinders of the engine.

The display device may also be designed to depict in color pressure values that are higher than a first threshold value for an increased pressure, or pressure values that are lower than a second threshold value for a reduced pressure.

The measured value detection device may be designed as an independent device. In particular, the measured value detection device may be designed as a measuring module for connection to a standard PC.

Alternatively, the measured value detection device may be designed as a supplementary device for an existing repair shop engine testing system.

In the engine testing device, the second adapter device may be designed for installation on at least one of the following: a lambda sensor and/or an exhaust gas sampling point on an exhaust manifold of the exhaust line of the engine.

The trigger device of the engine testing device may be designed for establishing an operative electrical connection with one or multiple elements which are selected from a group that includes the following: an ignition pulse line, in particular a first, second, third, or fourth ignition pulse line, to at least one of the cylinders of the engine, a connecting terminal, in particular a first, second, third, or fourth connecting terminal, corresponding to the first ignition pulse line, on the distributor of the engine for an injector of at least one of the cylinders of the engine, an injector device of the engine, or a supply line of a pump-nozzle unit element of the engine.

A method for detecting pressures in an air intake line and in an exhaust line of a four-stroke internal combustion engine with the engine running, and for dynamic pressure loss and valve seal-tightness testing on the engine, includes the following steps:
a) letting the engine run,
b) with the engine running, measuring a first pressure value of at least one of the air intake lines to at least one of the cylinders of the engine (10) with the aid of a first pressure gauge,
c) with the engine running, measuring a second pressure value in the exhaust line with the aid of a second pressure gauge,
d) detecting an electrical signal that is indicative of when a certain cylinder of the engine is the particular active cylinder, with the aid of a trigger device, and
e) establishing an association between points in time of the pressure measurement by the first and the second pressure gauges and the particular active cylinder of the engine.

The method may also include the following steps:
displaying at least one of the following pieces of pressure information:
a variation in pressure over time in at least one air intake line to at least one cylinder of the engine,
a variation in pressure over time in an exhaust line,
a minimum pressure value, a maximum pressure value, and an average pressure value, in particular a time-averaged value, in the at least one air intake line to the at least one cylinder of the engine, and
a minimum pressure value, a maximum pressure value, and an average pressure value, in particular a time-averaged value, in the exhaust line of the engine.

In the method, the pressure information of at least two, in particular all, cylinders of the engine may be visually compared to one another.

In addition, in the method, pressure values that are higher than a first threshold value for an increased pressure, or pressure values that are lower than a second threshold value for a reduced pressure, may be depicted in color.

DETAILED DESCRIPTION OF THE INVENTION

Figure 3:
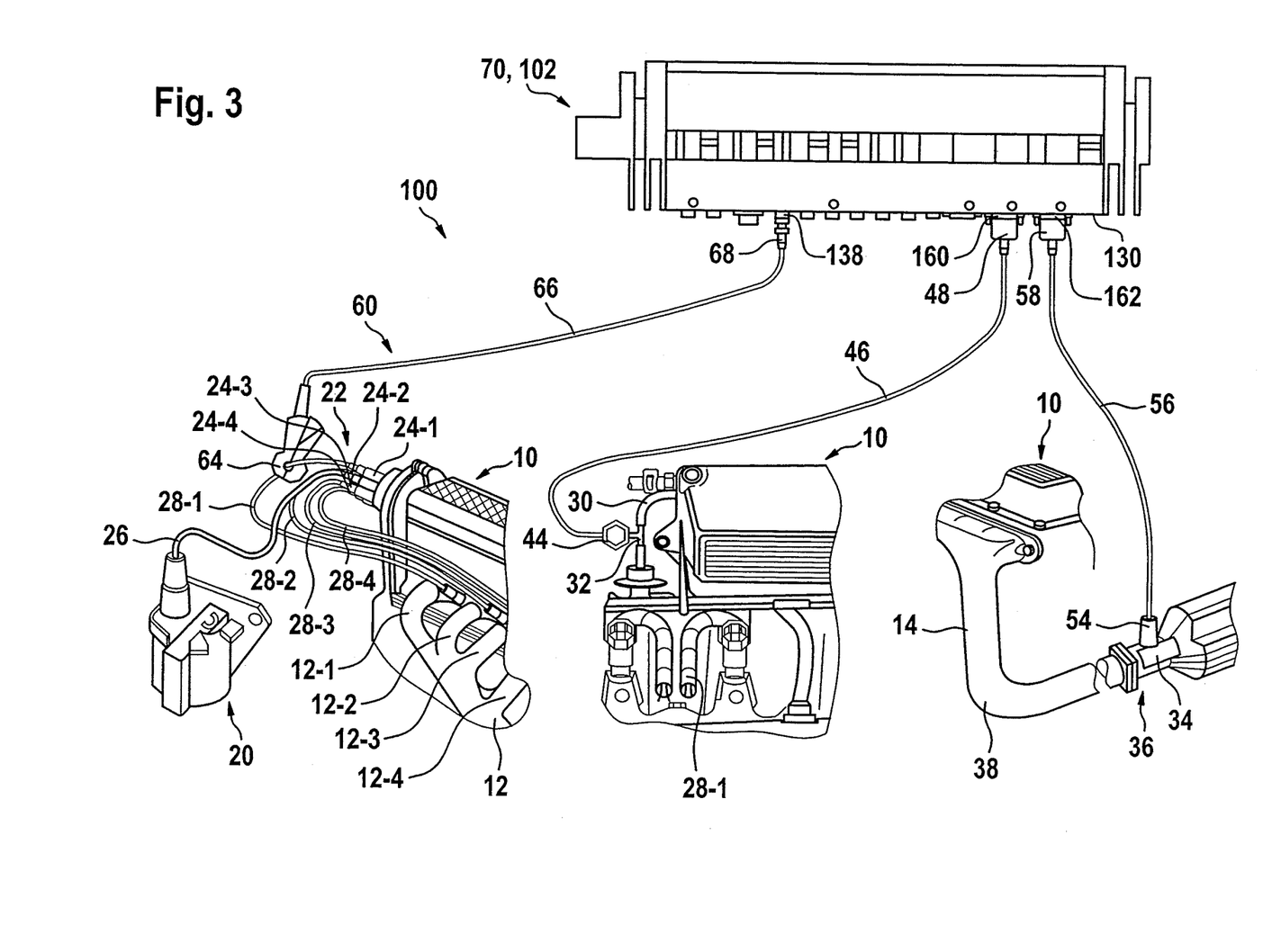
FIG. 3 shows a schematic view of an engine testing device according to the present invention in a ready-to-operate state, connected to a four-stroke internal combustion engine.

To provide the functionality according to the present invention for detecting pressures in an air intake line and in an exhaust line of a four-stroke internal combustion engine with the engine running, and for dynamic pressure loss and valve seal-tightness testing according to the present invention on the four-stroke internal combustion engine, it is provided that, as an expansion of the known engine testing device described above with reference to FIG. 1, a first pressure gauge 40 (see FIG. 4) for detecting a pressure value in an air intake line to a cylinder of the running engine and a second pressure gauge 50 (likewise see FIG. 4) for detecting a pressure value in an exhaust line of the running engine are connected to the measuring device 102 of an engine testing device 100 expanded according to the present invention, as shown in FIG. 3.

Figure 2:
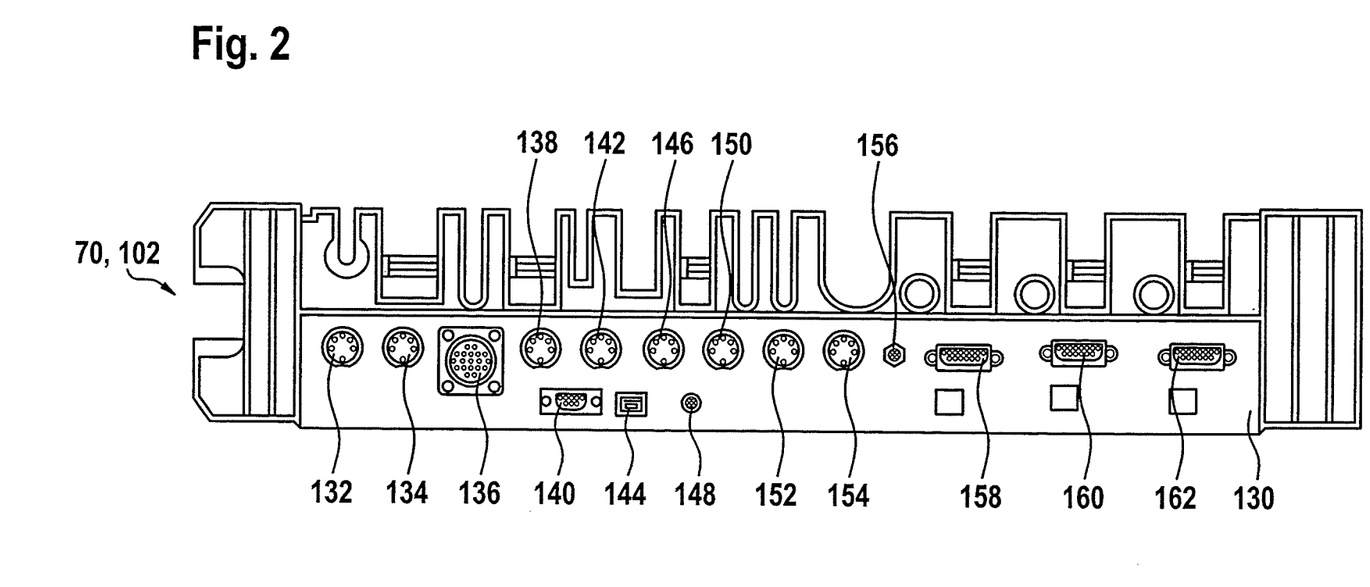
FIG. 2 shows a rear view of a terminal strip of a measuring device of the engine testing device in FIG. 1 which has been expanded to form one specific embodiment of an engine testing device according to the present invention.
Figure 4:
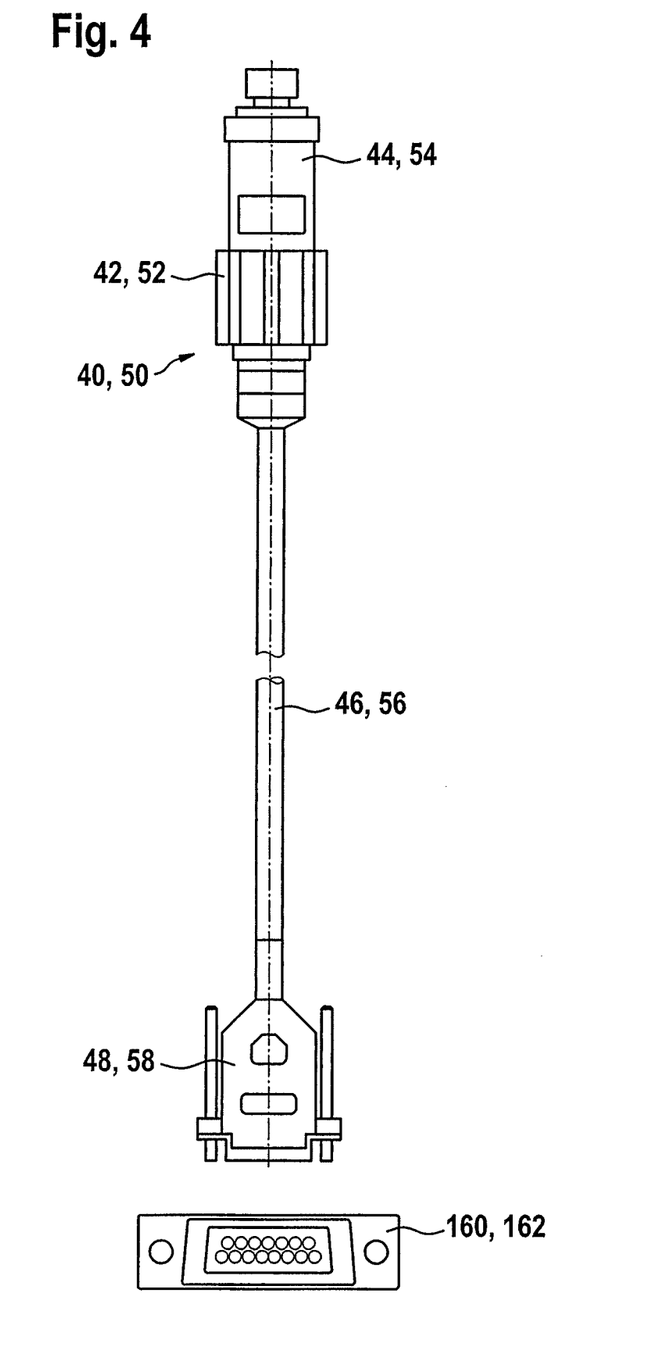
FIG. 4 shows a schematic top view of one specific exemplary embodiment of a first pressure gauge (intake-side) and second pressure gauge (exhaust-side) of the engine testing device according to the present invention in FIG. 3.

In the embodiment variant of an engine testing device 100 expanded according to the present invention shown in FIG. 2, terminal strip 130 of measuring device 102 is expanded, and two corresponding connection sockets for pressure gauges 40 and 50 are provided, namely, a connection socket 160 for first pressure gauge 40 measuring on the intake side and a connection socket 162 for second pressure gauge 50 measuring on the exhaust side, a plug 48 or 58 (see FIG. 4) of the first or second pressure gauge 40 or 50, respectively, being configured as a mating part for connection socket 160 or 162, respectively (see FIG. 2), as shown in FIG. 4. Alternatively or additionally, it may also be provided that first and second pressure gauges 40 and 50 are connected to connection sockets 150 and 152, respectively, i.e., the connection sockets for multimeter line CH1 or multimeter line CH2 (not shown), the plug of first or second pressure gauge 40 or 50 then being configured as a mating part for connection socket 150 or 152, respectively.

FIG. 3 schematically shows an example of an engine testing device 100 according to the present invention for testing a four-stroke internal combustion engine 10, in a state connected to engine 10. Engine testing device 100 includes a first pressure gauge 40 for detecting a pressure value in an air intake line 12-1, 12-2, 12-3, 12-4 to a cylinder of engine 10, which in particular is running, and for outputting a first output signal 82-1, 82-2, 82-3, 82-4, 83-1, 83-2, 83-3, 83-4 that is indicative of the pressure value to be detected by first pressure gauge 40, via a first signal line 46 having a first signal line plug 48 which is connected to connection socket 160 for intake-side pressure gauge 40 on terminal strip 130 of measuring unit 102 expanded according to the present invention, a second pressure gauge 50 for detecting a pressure value in an exhaust line 14, 38 of engine 10, which in particular is running, and for outputting a second output signal 84-1, 84-2, 84-3, 84-4, 85-1, 85-2, 85-3, 85-4 that is indicative of the pressure value to be detected by second pressure gauge 50, via a second signal line 56 having a second signal line plug 58 which is provided at connection socket 162 for exhaust-side pressure gauge 50 on terminal strip 130, and a trigger device 60, for example a conventional clip-on trigger sensor 64, for detecting an electrical signal that is indicative of when a certain cylinder of engine 10, which in particular is running, is the particular active cylinder.

Engine testing device 100 according to the present invention also includes a measured value detection device 70 which is designed for detecting the output signal of first pressure gauge 40, the output signal of second pressure gauge 50, and an output signal of trigger device 60. Measured value detection device 70 is also designed for allowing an association between the points in time of the pressure measurement by first and second pressure gauges 40, 50, respectively, and the particular active cylinder of engine 10. In the exemplary embodiment shown in FIGS. 2 and 3, measured value detection device 70 according to the present invention is designed as an expansion of a measuring unit 102 of a conventional engine testing device as shown in FIG. 1, and is integrated with this measuring unit 102.

FIG. 4 shows one specific exemplary embodiment of first and second pressure gauges 40, 50, respectively. First or intake-side pressure gauge 40 includes first or intake-side actual pressure sensor 42, a first or intake-side adapter device 44 for attaching or connecting intake-side pressure sensor 42 to an air intake line, for example for connecting to a T-piece 32 inserted into an intake-side negative pressure hose 30, first signal line 46 for transmitting control signals to pressure sensor 42 and for transmitting an electrical measuring signal from pressure sensor 42 to measured value detection device 70, and first signal line plug 48, which is situated on the opposite end of first signal line 46 with respect to pressure sensor 42 and designed for connecting to connection socket 160 of terminal strip 130 shown in FIG. 3. Similarly, second or exhaust-side pressure gauge 50 includes second or exhaust-side actual pressure sensor 52, a second or exhaust-side adapter device 54 which is designed to connect second pressure sensor 52 to the pressure prevailing in exhaust line 14 of engine 10, second signal line 56 for transmitting control signals to pressure sensor 52 and for transmitting an electrical measuring signal that is indicative of the pressure detected by pressure sensor 52 to measured value detection device 70, and a second signal line plug 58 which is provided on the opposite end of signal line 56 with respect to second pressure sensor 52 and designed for connecting to connection socket 162 for exhaust-side pressure gauge 50. A connection for second adapter device 54 to the pressure in exhaust line 14 may be provided at exhaust manifold 38, for example, or at another exhaust gas sampling point 36 of the exhaust system which is provided at a lambda sensor 34, for example, as shown in FIG. 3.

Figure 5:
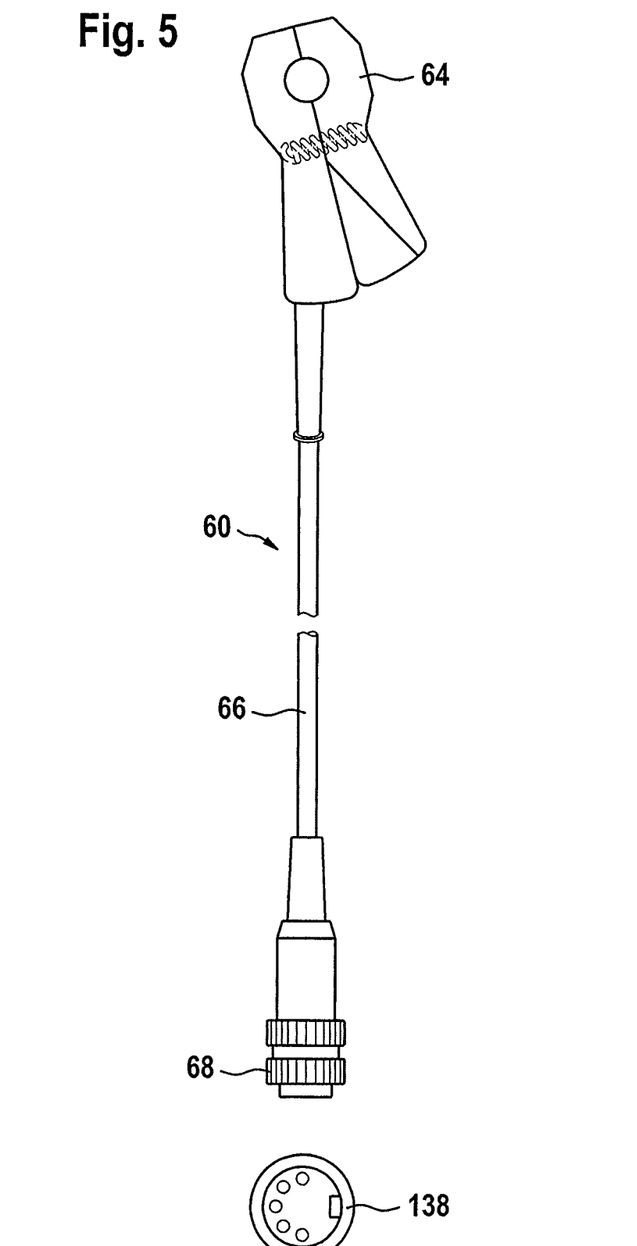
FIG. 5 shows a schematic top view of one specific exemplary embodiment of a trigger device, known per se, which is used in the engine testing device according to the present invention in FIG. 3.

Trigger device 60 shown in FIG. 5 is used for detecting an electrical signal that is indicative of which cylinder of engine 10 is the active cylinder at a particular point in time. These types of trigger devices are known; one specific embodiment is disclosed in Published German Patent Application document DE 44 15 768 A1, for example. In the specific exemplary embodiment shown in FIG. 5, trigger device 60 includes a conventional clip-on trigger sensor 64 for connecting to one of first, second, third, or fourth ignition pulse lines 28-1, 28-2, 28-3, 28-4, respectively, to a corresponding ignition device such as a spark plug or other ignition device of engine 10, a trigger signal line 66 for connecting clip-on trigger sensor 64 to a trigger signal line plug 68, and trigger signal line plug 68, provided on the opposite end of trigger signal line 66 with respect to clip-on trigger sensor 64, which is designed for connecting to connection socket 138 for the trigger device on terminal strip 130 (see FIG. 2) of measured value detection device 70.

Figure 6:
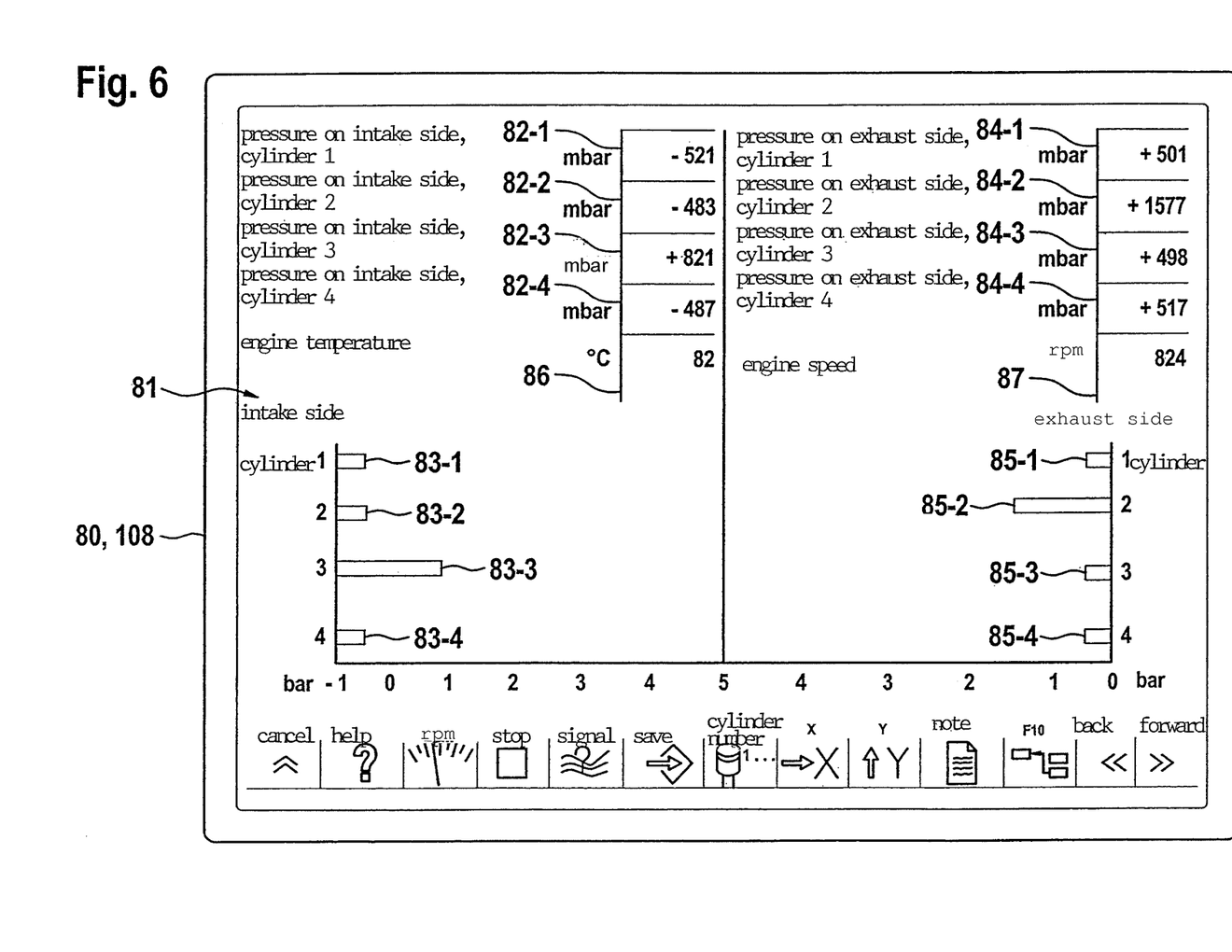
FIG. 6 shows an example of a screen image on a display device of an engine testing device according to the present invention, with the output values (as an example, intake-side and exhaust-side measured pressure values of four cylinders of a four-stroke internal combustion engine) for dynamic pressure loss and valve seal-tightness testing according to the present invention on the four-stroke internal combustion engine.

For outputting the intake-side and exhaust-side pressure values measured using engine testing device 100 according to the present invention, the menu of the measuring functions of the conventional engine testing device is expanded by appropriate control menus and input-output screens for operating the function according to the present invention of detecting pressures in the air intake line and in the exhaust line of a four-stroke internal combustion engine with the engine running, and for dynamic pressure loss and valve seal-tightness testing on running engine 10. An example of a screen image 81 on display device 80, 108 of engine testing device 100 expanded according to the present invention has the title "Dynamic pressure measurement" as shown in FIG. 6, and in an image at the upper half of the screen includes an upper output field for outputting digitally displayed measured pressure values, in particular the intake-side pressure at the particular cylinder (pressure values 82-1, 82-2, 82-3, 82-4 for the pressures at the first, second, third, and fourth cylinder, respectively, are shown as an example) and for outputting digitally displayed pressure values 84-1, 84-2, 84-3, 84-4, measured at the exhaust side, which are measured at points in time when the first, second, third, or fourth cylinder, respectively, is the particular active cylinder. The upper output field shown in FIG. 6 also displays a measured value 86 for the engine temperature and a measured value 87 for the engine speed. In an image at the lower half of the screen, screen image 81 shown in FIG. 6 has quasi-analog displays for the measured pressure values, in particular in the form of a bar chart, including the displayed pressure values 83-1, 83-2, 83-3, 83-4 for the intake-side pressure at the first, second, third, and fourth cylinder, respectively, and a bar chart having pressure values 85-1, 85-2, 85-3, and 85-4 which are displayed in a quasi-analog manner and which are measured at points in time when the first, second, third, and fourth cylinder, respectively, is the particular active cylinder.

In the example shown in FIG. 6, the digital or quasi-analog output pressure values at the intake side and at the exhaust side, displayed in screen image 81, are time-averaged values for the particular pressure. In further screen images not shown, it may also be provided that pressure-time curves for the intake-side pressure or the exhaust-side pressure are displayed when the first, second, third, or fourth cylinder is the particular active cylinder. It may also be provided that a minimum, a maximum, and a time-averaged pressure value are output for each of the above-mentioned pressure values for which a pressure-time curve may be depicted.

The normal pressure values in the intake area and in the exhaust area of any given four-stroke internal combustion engine are a function of the engine type and the engine design. These pressure values are also a function of the air pressure at the time of measurement. In the normal case (i.e., in the so-called good case), as a function of the engine design, the pressure values in the intake area of an engine in idle mode are approximately –500 mbar (i.e., a negative pressure) and in the exhaust area up to approximately 500 mbar (i.e., a positive pressure). For error recognition and error detection, the various pressure values from one engine cylinder to the next which should be measured at the various cylinders of the engine are important. In the ideal case, these various pressure values are similar or the same from one cylinder to the next. If the deviation in pressure values from one cylinder to the next is greater than a selectable tolerance of, for example, 20% of the measured pressure value, it is assumed that an error state is present. In the example shown in FIG. 6, an error state is present for intake-side pressure value 82-3 of the third cylinder, and for exhaust-side pressure value 84-2 of the second cylinder.

Trigger device 60, in particular clip-on trigger sensor 64, may be connected to the following lines: to terminals 1 through 4 (or 1 through n for an n-cylinder four-stroke engine) of distributor 22, or to first, second, third, or fourth (or nth) ignition pulse line 28-1, 28-2, 28-3, 28-4, respectively, leading from the particular terminal 24-1, 24-2, 24-3, 24-4, respectively.

The dynamic pressure loss and valve seal-tightness testing according to the present invention may be implemented in the following embodiments:

as a supplementary device, for example in the form of a supplementary device 104 for an existing measuring device 102 (as indicated in FIG. 1) having an expanded menu for the dynamic pressure loss and valve seal-tightness testing, as an expansion of a measuring device 102 for detecting engine test signals in a conventional engine testing system, and having a supplementary function menu or test procedure for the dynamic pressure loss and valve seal-tightness testing, or as an independent or "stand-alone" device, which may then be used together with a variety of operating systems, for example, as a measuring module on a standard PC, and for which special software is installed on the PC.

During operation of engine testing device 100 according to the present invention, after four-stroke internal combustion engine 10 has been started, the pressure on the intake side and on the exhaust side of engine 10 is detected via first or intake-side pressure sensor 40 and second or exhaust-side pressure sensor 50, respectively. With the aid of the trigger signal of trigger device 60, for example clip-on trigger sensor 64, computer 106 associates the appropriate measured pressure values with the individual cylinders of engine 10 and shows them on a display device 80, such as monitor 108 of an engine testing device, in the form of a suitably programmed and configured screen image, such as screen image 81 shown in FIG. 6.

By visually comparing the pressure displays, i.e., the pressure values associated with the various cylinders, a relatively simple and quick evaluation may be made as to whether there are differences in pressure between the individual cylinders. Increased pressures, which are indicative of the presence of errors, may also be depicted in screen image 81 in color. A valve of the corresponding cylinder of the engine which does not close tightly may, for example, be deduced from an increased pressure value. The dynamic pressure loss and valve seal-tightness testing according to the present invention may be carried out on all four-stroke internal combustion engines that are equipped with an exhaust gas sampling point on an exhaust pipe, or equipped with a lambda sensor.

LIST OF REFERENCE NUMERALS

10 four-stroke internal combustion engine
12 air intake line
12-1, . . . , 12-4 air intake line for the first, second, third, and fourth cylinder
14 exhaust line
20 ignition coil
22 distributor
24 terminal
24-1, . . . , 24-4 first, second, third, and fourth terminal
26 ignition pulse line
28-1, . . . , 28-4 first, second, third, and fourth ignition pulse line
30 negative pressure hose
32 T-piece
34 lambda sensor
36 exhaust gas sampling point
38 exhaust manifold
40 first or intake-side pressure gauge 42 first or intake-side pressure sensor
44 first or intake-side adapter device
46 first signal line
48 first signal line plug
50 second or exhaust-side pressure gauge
52 second or exhaust-side pressure sensor
54 second or exhaust-side adapter device
56 second signal line
58 second signal line plug
60 trigger device
64 clip-on trigger sensor
66 trigger signal line
68 trigger signal line plug
70 measured value detection device
80 display device
81 screen image
82-1, . . . , 82-4 intake-side pressure for active first, second, third, and fourth cylinder (digital pressure value display)
83-1, . . . , 83-4 intake-side pressure for active first, second, third, and fourth cylinder (quasi-analog pressure value display)
84-1, . . . , 84-4 exhaust-side pressure for active first, second, third, and fourth cylinder (digital pressure value display)
85-1, . . . , 85-4 exhaust-side pressure for active first, second, third, and fourth cylinder (quasi-analog pressure value display)
86 engine temperature
88 engine speed
100 engine testing device
101 repair shop engine testing system
102 measuring unit
104 expansion module
106 PC
108 display device, for example a monitor
110 keyboard
112 mouse
114 printer
116 printer cover
118 remote control unit
120 remote control receiver
122 Bluetooth USB adapter
130 terminal strip
132 connection socket for temperature sensor
134 connection socket for positive/negative battery terminals
136 connection socket for terminal 1/terminal 15/EST/TN/TD
138 connection socket for trigger device
140 connection socket for serial interface, for example RS232
142 connection socket for KV− sensor
144 connection socket for USB connection for data link to PC
146 connection socket for KV+ sensor
148 connection socket for voltage supply measuring unit (power supply)
150 connection socket for multimeter line CH1 or current probe 30A
152 connection socket for multimeter line CH2 or current probe 30A or 1000A
154 connection socket for stroboscope
156 connection socket for air pressure measurement
158 connection socket for fluid pressure gauge
160 connection socket for first or intake-side pressure gauge
162 connection socket for second or exhaust-side pressure gauge

What is claimed is:
1. An engine testing device for an internal combustion engine having a plurality of cylinders, the device comprising:
a first pressure gauge measuring at least one pressure value in an air intake line to the cylinders of the engine, and outputting a first output signal indicative of the pressure value measured by the first pressure gauge;
a second pressure gauge measuring at least one pressure value in an exhaust line of the engine, and outputting a second output signal indicative of the pressure value measured by the second pressure gauge;
a trigger device detecting an electrical signal indicative of when a cylinder of the engine is an active cylinder;
a first adapter device configured for (i) installing a first pressure sensor of the first pressure gauge on the air intake line of the engine, (ii) accommodating the first pressure sensor, and (iii) establishing fluid and pressure communication between a line interior of the air intake line and the first pressure sensor;
a second adapter device configured for (iv) installing a second pressure sensor of the second pressure gauge on the exhaust line of the engine, (v) accommodating the second pressure sensor, and (vi) establishing fluid and pressure communication between a line interior of the exhaust line and the second pressure sensor;
a measured value detection device detecting (i) the output signal of the first pressure gauge, (ii) the output signal of the second pressure gauge, and (iii) an output signal of the trigger device;
wherein the engine testing device is configured to simultaneously provide a first association between points in time of the pressure measurements by the first pressure gauge and the active cylinder of the engine, and provide a second association between points in time of the pressure measurements by the second pressure gauge and the active cylinder of the engine; and
a display device for simultaneously displaying a first variation in pressure over time in the air intake line of the engine for each cylinder, and a second variation in pressure over time in the exhaust line of the engine for each cylinder;
wherein the display device displaying an error if the first variation in pressure between at least two cylinders is greater than a selectable tolerance or if the second variation in pressure between at least two cylinders is greater than a selectable tolerance.

2. The engine testing device as recited in claim 1, wherein the display device displaying a minimum pressure value, a maximum pressure value, and an average pressure value over time in the at least one air intake line to the at least one cylinder of the engine; and a minimum pressure value, a maximum pressure value, and an average pressure value over time in the exhaust line of the engine.

3. The engine testing device as recited in claim 2, wherein the display device provides a visual comparison of the pressure information of at least two cylinders of the engine.

4. The engine testing device as recited in claim 2, wherein the display device depicts in color one of (i) pressure values which are higher than a first threshold value for an increased pressure, or (ii) pressure values which are lower than a second threshold value for a reduced pressure.

5. The engine testing device as recited in claim 4, wherein the measured value detection device is a device physically independent from the remaining components of the engine testing device.

6. The engine testing device as recited in claim 5, wherein the measured value detection device is a measuring module for connection to a computer.

7. The engine testing device as recited in claim 4, wherein the measured value detection device is a supplementary device for an existing repair shop engine testing system.

8. The engine testing device as recited in claim 2, wherein the second adapter device is configured for installation on at least one of (i) a lambda sensor and (ii) an exhaust gas sampling point on an exhaust manifold of the exhaust line of the engine.

9. The engine testing device as recited in claim 2, wherein the trigger device is configured for establishing an operative electrical connection with at least one of: (i) an ignition pulse line to at least one of the cylinders of the engine; (ii) a connecting terminal corresponding to the ignition pulse line, on the distributor of the engine; (iii) an injector of at least one of the cylinders of the engine; (iv) an injector device of the engine; and (v) a supply line of a pump-nozzle unit element of the engine.

10. A method for detecting dynamic pressure loss in an internal combustion engine having a plurality of cylinders, the method comprising:
   a) starting the engine;
   b) measuring a first pressure value of at least one selected air intake line to at least one of the cylinders of the engine with the aid of a first pressure gauge using a first adapter device configured for (i) installing a first pressure sensor of the first pressure gauge on the air intake line of the engine, (ii) accommodating the first pressure sensor, and (iii) establishing fluid and pressure communication between a line interior of the air intake line and the first pressure sensor;
   c) measuring a second pressure value in the exhaust line with the aid of a second pressure gauge using a second adapter device configured for (iv) installing a second pressure sensor of the second pressure gauge on the exhaust line of the engine, (v) accommodating the second pressure sensor, and (vi) establishing fluid and pressure communication between a line interior of the exhaust line and the second pressure sensor;
   d) detecting, with the aid of a trigger device, an electrical signal indicative of when a cylinder of the engine is an active cylinder;
   e) simultaneously establishing a first association between points in time of the pressure measurements by the first pressure gauge and the active cylinder of the engine, and a second association between points in time of the pressure measurements by the second pressure gauge and the active cylinder of the engine;
   (f) simultaneously displaying a first variation in pressure over time in the air intake line of the engine for each cylinder, and a second variation in pressure over time in the exhaust line of the engine for each cylinder; and
   g) displaying an error if the first variation pressure between at least two cylinders is greater than a selectable tolerance or if the second variation pressure between at least two cylinders is greater than a selectable tolerance.

11. The method as recited in claim 10, further comprising displaying a minimum pressure value, a maximum pressure value, and an average pressure value over time in the at least one air intake line to the at least one of the cylinders of the engine; and a minimum pressure value, a maximum pressure value, and an average pressure value over time in the exhaust line of the engine.

12. The method as recited in claim 11, further comprising: providing a visual comparison of the pressure information of at least two cylinders of the engine.

13. The method as recited in claim 11, further comprising: depicting in color one of: (i) pressure values which are higher than a first threshold value for an increased pressure; or (ii) pressure values which are lower than a second threshold value for a reduced pressure.

* * * * *